(12) United States Patent
Manneschi

(10) Patent No.: US 7,352,180 B2
(45) Date of Patent: Apr. 1, 2008

(54) MAGNETIC RESONANCE DETECTOR FOR DETECTING NON-AUTHORIZED MATERIALS IN FOOTWEAR

(76) Inventor: Alessandro Manneschi, 15, Via XXV Aprile, I-52100 Arezzo (IT)

( * ) Notice: Subject to any disclaimer, the term of this patent is extended or adjusted under 35 U.S.C. 154(b) by 417 days.

(21) Appl. No.: 10/817,387

(22) Filed: Apr. 1, 2004

(65) Prior Publication Data
US 2005/0073307 A1    Apr. 7, 2005

(30) Foreign Application Priority Data

Oct. 2, 2003  (FR) .................................. 03 11575
Mar. 12, 2004 (EP) .................................. 04290684

(51) Int. Cl.
*G01V 3/00* (2006.01)

(52) U.S. Cl. .................................................. 324/307

(58) Field of Classification Search .................. None
See application file for complete search history.

(56) References Cited

U.S. PATENT DOCUMENTS

| 3,707,672 | A |   | 12/1972 | Miller et al. |
|-----------|---|---|---------|---------------|
| 3,971,983 | A |   | 7/1976  | Jaquet |
| 4,012,690 | A |   | 3/1977  | Heytow |
| 4,019,053 | A |   | 4/1977  | Levine |
| 4,263,551 | A |   | 4/1981  | Gregory et al. |
| 4,449,115 | A |   | 5/1984  | Koerner |
| 4,866,424 | A |   | 9/1989  | Parks |
| 4,866,439 | A |   | 9/1989  | Kraus |
| 4,987,767 | A |   | 1/1991  | Corrigan et al. |
| 5,039,981 | A |   | 8/1991  | Rodriguez |
| 5,073,782 | A |   | 12/1991 | Huguenin et al. |
| 5,109,691 | A |   | 5/1992  | Corrigan et al. |
| 5,121,105 | A |   | 6/1992  | Aittoniemi |
| 5,206,592 | A |   | 4/1993  | Buess et al. |
| 5,233,300 | A | * | 8/1993  | Buess et al. ................. 324/307 |
| 5,341,126 | A |   | 8/1994  | Boykin |
| 5,361,764 | A |   | 11/1994 | Reynolds et al. |
| 5,365,171 | A |   | 11/1994 | Buess et al. |
| 5,420,905 | A |   | 5/1995  | Bertozzi |
| 5,592,083 | A |   | 1/1997  | Magnuson et al. |
| 5,594,337 | A | * | 1/1997  | Boskamp ..................... 324/318 |
| 5,600,303 | A |   | 2/1997  | Husseiny et al. |
| 5,680,103 | A |   | 10/1997 | Turner et al. |
| 5,689,184 | A |   | 11/1997 | Jeffers et al. |
| 5,692,029 | A |   | 11/1997 | Husseiny et al. |

(Continued)

FOREIGN PATENT DOCUMENTS

EP           0490921          4/1994

(Continued)

*Primary Examiner*—Diego Gutierrez
*Assistant Examiner*—Dixomara Vargas
(74) *Attorney, Agent, or Firm*—Blakely Sokoloff Taylor & Zafman

(57) ABSTRACT

The present invention relates to a device for detecting a non-authorized material in a zone with protected access, the device being characterized by the fact that it comprises in combination:
  a supporting base (100) designed to receive a single foot wearing a shoe, of an individual to be inspected;
  detector means (430, 450, 460) adapted to detect a target material by employing at least one magnetic resonance technique to detect said non-authorized material and associated with the support base (100); and
  position-identifying means (400) on the support base (100) suitable for imposing accurate positioning of the foot of the individual being inspected relative to the detector means.

24 Claims, 13 Drawing Sheets

U.S. PATENT DOCUMENTS

| | | |
|---|---|---|
| 5,726,628 A | 3/1998 | Yoo |
| 5,790,685 A | 8/1998 | Sallee |
| 6,133,829 A | 10/2000 | Johnstone et al. |
| 6,150,810 A | 11/2000 | Roybal |
| 6,150,816 A * | 11/2000 | Srinivasan ............... 324/318 |
| 6,166,541 A | 12/2000 | Smith et al. |
| 6,218,830 B1 | 4/2001 | Yoshida et al. |
| 6,285,901 B1 * | 9/2001 | Taicher et al. ............. 600/410 |
| 6,323,648 B1 * | 11/2001 | Belt et al. ................. 324/322 |
| 6,342,696 B1 | 1/2002 | Chadwick |
| 6,344,818 B1 | 2/2002 | Markov |
| 6,359,582 B1 | 3/2002 | MacAleese et al. |
| 6,362,739 B1 | 3/2002 | Burton |
| 6,392,408 B1 | 5/2002 | Barrall et al. |
| 6,489,872 B1 | 12/2002 | Fukushima et al. |
| 6,507,278 B1 | 1/2003 | Brunetti et al. |
| 6,507,309 B2 | 1/2003 | McMakin et al. |
| 6,750,653 B1 * | 6/2004 | Zou et al. ................. 324/318 |
| 2001/0042412 A1 | 11/2001 | Serban et al. |
| 2002/0130804 A1 | 9/2002 | McMakin et al. |
| 2003/0128150 A1 | 7/2003 | McMakin et al. |
| 2003/0142853 A1 | 7/2003 | Waechner et al. |
| 2005/0122109 A1 * | 6/2005 | Wilker et al. ............... 324/318 |

FOREIGN PATENT DOCUMENTS

| | | |
|---|---|---|
| EP | 0740822 | 1/1995 |
| FR | 2607937 | 6/1987 |
| FR | 2610417 | 6/1987 |
| FR | 2608286 | 10/1987 |
| FR | 2698968 | 12/1992 |
| FR | 2694098 | 7/1993 |
| FR | 2697919 | 8/1993 |
| FR | 2720519 | 5/1995 |
| FR | 2780585 | 1/1999 |
| FR | 2775350 | 2/1999 |
| JP | 05119156 | 5/1993 |
| JP | 2002260040 | 9/2002 |
| WO | WO97/42527 | 11/1997 |
| WO | WO97/5000 | 12/1997 |
| WO | WO98/12573 | 3/1998 |
| WO | WO88/07733 | 10/1998 |
| WO | WO 2003/032011 | 4/2003 |
| WO | WO 2003/076952 | 9/2003 |

* cited by examiner

FIG_1

FIG_2

FIG_14

MAGNETIC RESONANCE DETECTOR FOR DETECTING NON-AUTHORIZED MATERIALS IN FOOTWEAR

BACKGROUND OF THE INVENTION

The present invention relates to the field of detectors designed for detecting non-authorized objects in a zone having protected access.

1. Field of the Invention

The present invention applies in particular to detecting non-authorized substances such as drugs.

2. Description of Related Art

Nowadays it is found to be necessary to check with a very high degree of reliability for attempts at introducing or removing non-authorized objects into or from a sensitive zone.

When posed in this way, the problem covers a very wide range of situations, and in particular but in non-limiting manner, it covers detecting objects stolen from chemical firms, customs warehouses, and attempts at introducing dangerous objects into protected zones such as schools, and public or private organizations.

Numerous means have already been proposed for performing such detection.

In particular, numerous substance detectors have already been proposed.

Those detectors are based on two possible techniques: trace detection or bulk detection.

The term "trace" refers to both vapor and particulate sampling of the substance.

Trace detectors are considered as passive systems in that they only detect the vapors or microscopic particles emitted from the non-authorized substance. Those systems have a basic physical limitation in the fact that if the non-authorized substance is well packed and the package has been properly cleaned, it doesn't releases any trace and the detection is not possible.

Bulk detectors, which use a source of radiation (x-rays, gamma rays, radio frequencies, or magnetic field) to stimulate a response from non-authorized substances, are considered as active systems. Different bulk detectors using different detection techniques such as NMR (Nuclear Magnetic Resonance) or NQR (Nuclear Quadrupole Resonance) will be able to detect different categories of substance.

Examples of known substance detectors, and in particular bulk detectors are to be found in the following documents: U.S. Pat. No. 5,206,592, U.S. Pat. No. 5,365,171, U.S. Pat. No. 5,420,905, U.S. Pat. No. 5,592,083, U.S. Pat. No. 6,166,541, U.S. Pat. No. 6,392,408, U.S. Pat. No. 6,489,872, WO-3 076 952.

Moreover, it is found nowadays that people attempting to remove substances fraudulently from a protected zone, a thief stealing from a warehouses, or people attempting to introduce prohibited substances, e.g. a school child attempting to introduce drugs into a school, are making ever-increasing use of shoes and/or socks for hiding the substance in question.

This phenomenon seems to be due essentially to the fact that this zone of the human body is not easy to inspect visually or by touch or by other current inspection means.

On some sensitive sites it is nowadays necessary to make use of X-ray inspection apparatus, thus requiring people leaving the site or entering the site to remove their shoes, since X-rays devices cannot be used directly on shoes that are still being worn because that would lead to exposing parts of the human body to ionizing radiation.

BRIEF SUMMARY OF THE INVENTION

Consequently, an object of the present invention is to provide novel means to improve the reliability with which substances are detected in a zone with protected access.

In the ambit of the present invention, this object is achieved by a device for detecting at least a non-authorized material in a zone with protected access.

Thus, as described in greater detail below, the invention differs from prior art devices known from the above-specified literature an/or from prior practice, by the fact that the device is specifically dedicated to detect prohibited substances in the shoes of individuals, and detection being based on Induction Nuclear Magnetic Resonance. This detection is performed on a single foot (shoe) at a time, and thus on two feet (shoes) in succession.

Thus, as described in greater detail below, the device of the present invention also differs from the prior art by the fact that it can use, on the same inspection volume, three types of resonance: Electronic Spin Resonance (ESS), Nuclear Magnetic Resonance (NMR) and Nuclear Quadrupole Resonance (NQR) also know as "Zero Field" Nuclear Magnetic Resonance.

The inventor has determined that the devices proposed in the prior art suffer from a major drawback: they use only one detection technique such as NQR, and do not combine different detection techniques, thus limiting itself to detect only narrow range of substances.

BRIEF DESCRIPTION OF THE DRAWINGS

Other characteristics, objects, and advantages of the present invention appear on reading the following detailed description and from the accompanying drawings given as non-limiting examples, and in which.

DETAILED DESCRIPTION OF THE INVENTION

Figure 1:
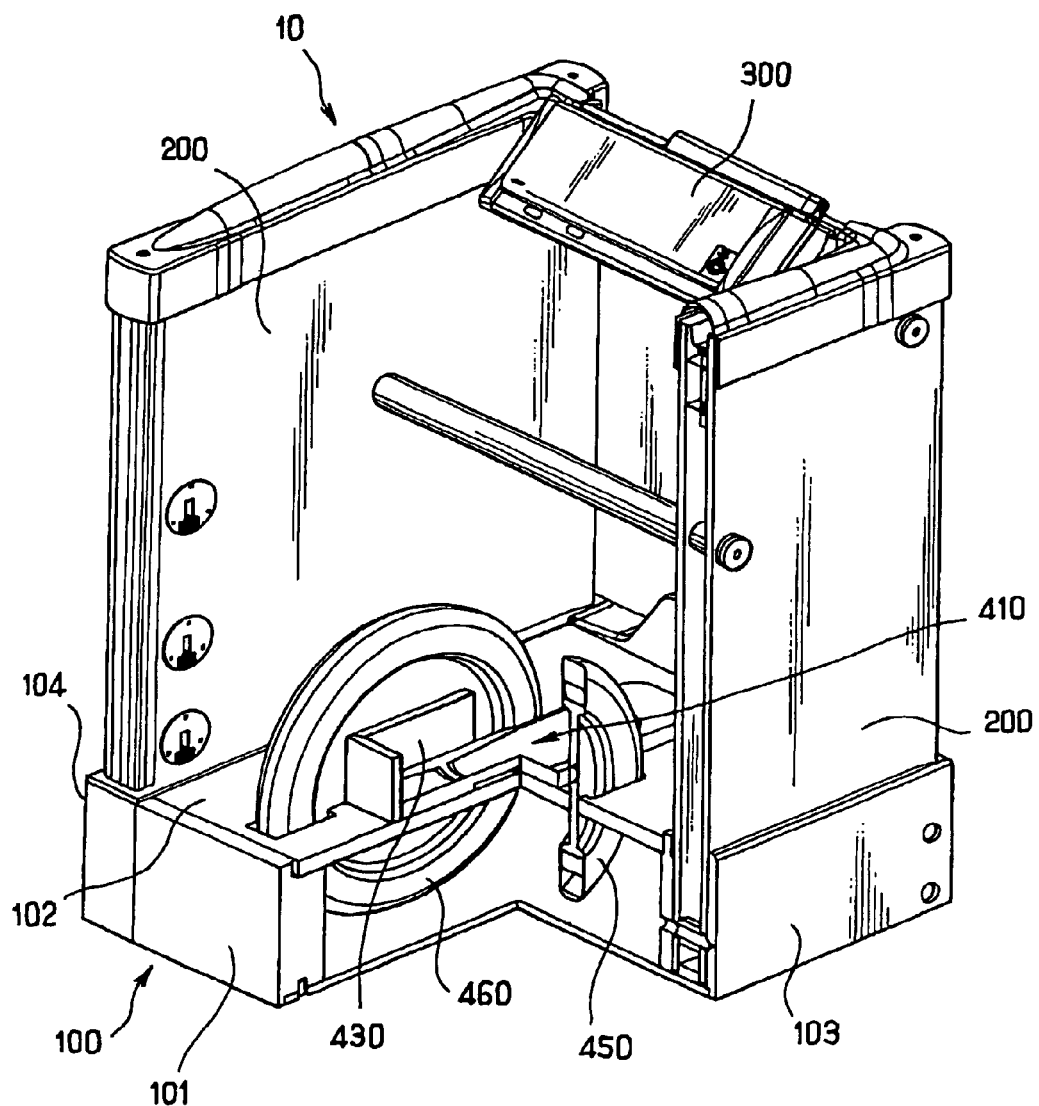
FIG. 1 is a perspective view of a stand of a device in accordance with the present invention.

As illustrated in FIG. 1, the stand 10 preferably comprises:
- a supporting base 100;
- two symmetrical side panels 200;
- position-identifying means 400;
- detector means 430, 450, 460 which comprise:
  - two lateral windings 450, 460; and
  - a shoe-TX/RX RF antenna 430;
- an information module 300.

The supporting base 100 is in the shape of a rectangular slab constituting a step. Its top surface 102 is plane.

The dimensions of the supporting base 100 are preferably as follows:
- width lying in the range 450 millimeters (mm) to 700 mm, typically being about 575 mm;
- depth lying in the range 500 mm to 900 mm, typically being about 626 mm; and
- height lying in the range 100 mm to 200 mm, typically being about 170 mm.

The top surface 102 comprises means forming the position-identifying marks where the individual to be inspected is supposed to put his foot.

The preferred shape of the means forming the position-identifying marks provided on the top surface 102 of the supporting base 100 in accordance with the present invention is described below.

The overall outline of the two vertical side panels 200 is rectangular. They are plane and parallel to each other. The two panels 200 project upwards from the base 100 in positions adjacent to its sides 103 and 104. The two side panels 200 in combination with the underlying supporting base 100 thus form a channel suitable for receiving a user's foot wearing a shoe.

The dimensions of the panels 200 are typically as follows:
- width corresponding to the depth of the supporting base 100; and
- height lying in the range 300 mm to 900 mm, typically being about 657 mm.

The step-shaped structure proposed for the supporting base 100 is designed in such a manner that the person being inspected does not need to climb onto a platform with a risk of falling and of embarrassment as a result of being exposed to other people in the vicinity. Using a supporting base 100 designed for receiving a single foot requires an action that is of the same type as the initial action in starting to climb a ladder, i.e. putting the foot in a well-indicated zone.

Compared with the prior art, such a step structure offers the following advantages:
- preparing to climb a step is a normal action undertaken daily and does not require any special instructions for it to be carried out properly;
- the same operation does not require physical effort, even for an old person or a pregnant woman, and in particular it does not require significant physical effort of the kind required, for example, for actually mounting onto a platform;
- such a structure provides a natural way of examining only one shoe at a time; and
- the structure is compact compared with a platform which must be mounted by the entire person, as is required certain known devices in the prior art.

The two lateral windings are two Helmholtz coils 450, 460 which have a circular form. Those two Helmholtz coils 450, 460 are assembled on the two sides of the shoe analysis position 410 such that the radial plane of the Helmholtz coil are parallel to each other and parallel to the side panels 200. The Helmholtz coils are assembled, especially, but not limited, beside the heel position, which is generally considered more suitable to conceal a certain quantity of non-authorized substance. The two coils, according to the Helmholtz criteria, originate a suitable magnetic field uniformity if their winding planes are positioned at a reciprocal distance equals to the mean radius of the same coils.

The dimensions of the circular Helmholtz coils are preferably as follows:
- the exterior diameter of the Helmholtz coils is about 350 mm;
- the interior diameter of the Helmholtz coils is about 250 mm;
- the depth of the Helmholtz coils is about 40 mm.

Figure 3:
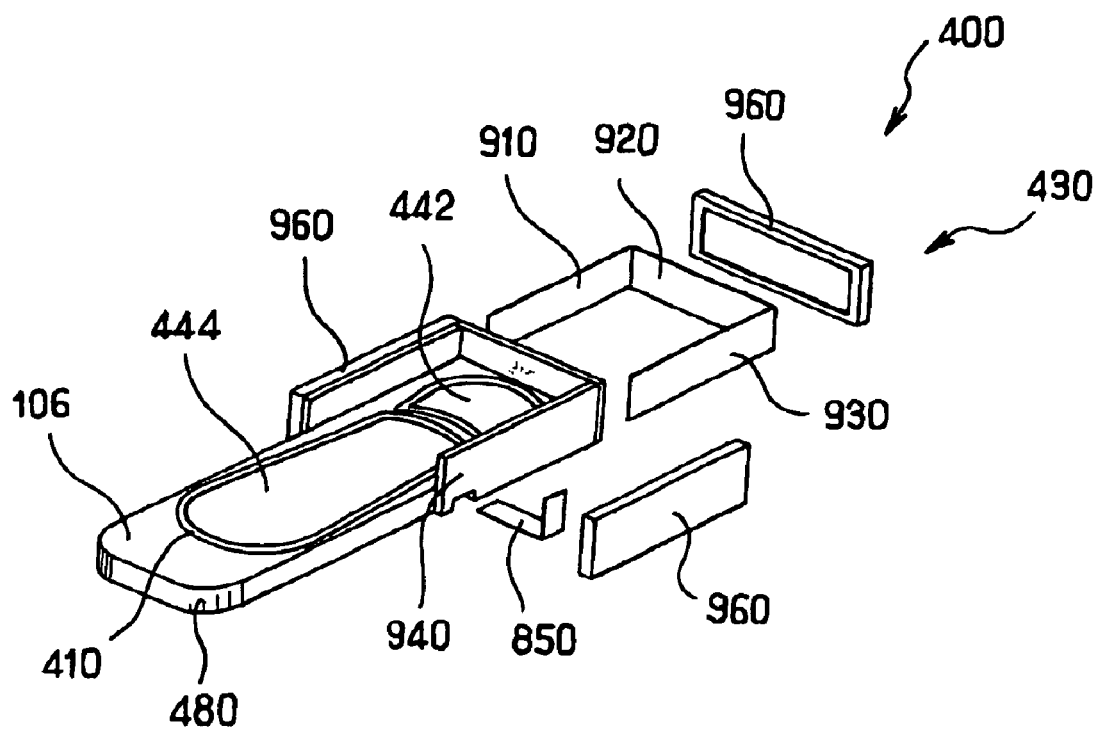
FIG. 3 is a perspective view of a TX/RX single coil shoe-TX/RX antenna in accordance with the present invention.

The shoe-TX/RX RF antenna 430 illustrated on FIGS. 1 and 3 is partially wound around the heel of the shoe, in order to get the maximum coupling with the materials concealed in the heel of the shoe. The shoe-TX/RX RF antenna is composed of three plane segments 910, 920, 930 assembled in a U form: the two lateral segments 910, 930 extend parallely to the side panels 200 and the intermediate segment 920 bridging the two lateral ones 910, 930, extends perpendicularly to the side panels 200. Those segments are electrically conductive. The opened side of the shoe-TX/RX RF antenna in a U form is opposite to the user, such that said antenna wounds around the heel of the shoe. The axis of the shoe-TX/RX RF antenna extends perpendicularly to the top surface 102 of the supporting base 100.

The dimensions of the shoe-TX/RX RF antenna 430 are preferably as follows:
- width (considered perpendicularly to the symmetrical side panels 200) lying in the range 100 millimeters (mm) to 150 mm, typically being about 130 mm;
- depth (considered perpendicularly to the front side 101 of the supporting base 100) lying in the range 100 mm to 200 mm, typically being about 141 mm; and
- height (considered perpendicularly to the top surface 102 of the supporting base 100) lying in the range 10 mm to 100 mm, typically being about 25 mm.

The height of the shoe-TX/RX RF antenna is selected to obtain a height of antenna sufficiently big to provide a sufficiently powerful signal, and sufficiently small to facilitate the placement of the shoe.

The information module 300 comprises means suitable for delivering visual and/or audible messages for guiding the user during the entire detection process. This module 300 preferably delivers successive messages having the following functions:
- indicating that the device is ready to perform detection, e.g. displaying the message "READY";
- inviting the individual to place a foot, or shoe, on the footprint marked for this purpose, for example by displaying a message of the form "PLACE SHOE"; and informing the individual that detection has been achieved successfully without raising an alarm, and then either inviting the person to repeat the procedure with the other foot, or else to withdraw, e.g. in the form of messages such as "PASSED" and "WITHDRAW".

Naturally, the means 300 preferably also include processor means suitable for making use of the electrical signals coming from the coils.

Figure 2:
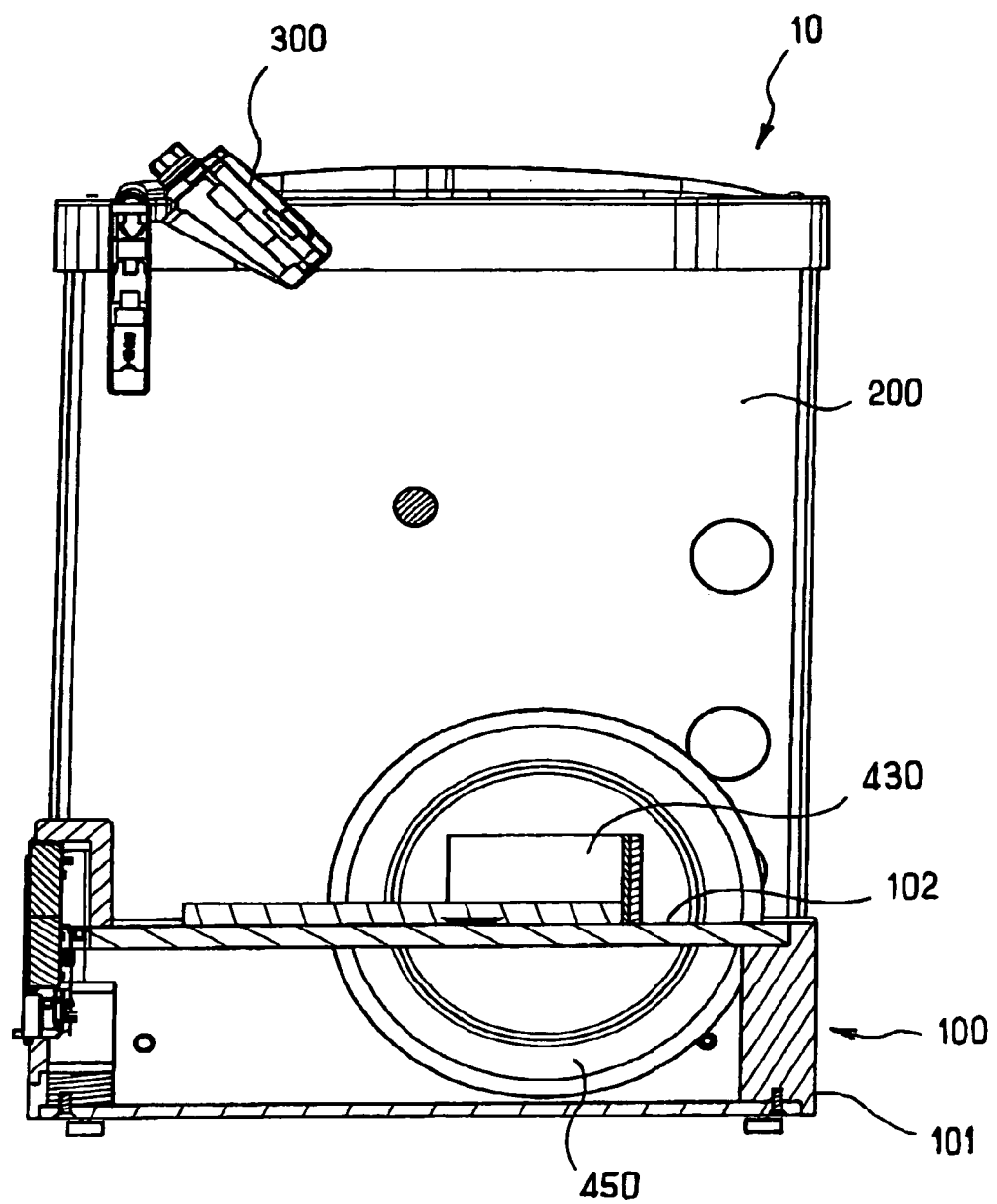
FIG. 2 is a cross sectional side view of a preferred embodiment of a device in accordance with the present invention.

As illustrated on FIG. 2, the two Helmholtz coils 450, 460 are partially embedded inside the step-shaped structure. This aspect is a way to take advantage from the geometry of the analyzer. The axis of the Helmholtz coils are not positioned at the height of the step support plane (where the shoe-sole lays), but they are shifted about 10 to 20 mm over the plane as the center of mass of the shoe content is at that height as well.

The positions of the Helmholtz coils 450, 460 are preferably as follows:
the height of the appearing part of each Helmholtz coil lying in the range 100 millimeters (mm) to 250 mm, typically being about 194 mm;
the space between the two Helmholtz coils lying in the range 70 millimeters (mm) to 200 mm, typically being about 130 mm.

The Helmholtz coils 450, 460 are preferentially equals (symmetric) and connected in series, in order to be supplied exactly with the same current. Never less they could also be supplied with separate drivers. The coil drivers are preferentially current controlled amplifiers in order to ensure the same magnetic generated field, independently from temperature and other environmental variations.

In the preferred embodiment, each Helmholtz coil is composed by one coil. In a slight different embodiment each one of the Helmholtz coils is composed by two coils, one with a very high number of turns (main coil), driven at low frequency or by a direct current, and the other one characterized by a lower inductance (secondary coil) and able to generate a fast magnetic field modulation sweep. The main coil generates the main share of the polarization magnetic field, the secondary coil being in charge of smaller, but quicker, amplitude modulations.

FIG. 3 is an illustration of the position-identifying means, and of the shoe-TX/RX RF antenna 430. The position-identifying means are given overall reference 400.

Those means preferably comprise a rectangular panel 480 on the top surface 106 of which is a drawing in the form of a footprint 410. The top and the bottom surfaces of the rectangular panel 480 are plane.

The dimensions of the rectangular panel 480 are typically as follows:
width (considered parallel to the front side 101 of the supporting base 100) lying in the range 80 mm to 120 mm, typically being about 106 mm; and
length (considered parallel to the symmetrical side panels 200) lying in the range 300 mm to 400 mm, typically being about 350 mm.

The footprint 410 is composed of two parts: a shorter part 442 is for placing beneath the heel, while a longer part 444 is for placing beneath the metatarsus.

The positioning footprint 410 may be drawn in or engraved on the top plane 106 of the rectangular panel 480.

The position identifying means 410 combined with the shoe-TX/RX RF antenna 430 permit to delimit a shoe analysis position. The shoe-TX/RX RF antenna forms a reference in relief serving to ensure that the heel of the shoe is in a particular position, and thus ensuring that shoes are repeatably positioned accurately relative to the Helmholtz coils. The inventor has found that such accurate and repeatable positioning is essential for analysis to be reliable.

The shoe-TX/RX RF antenna 430 has a general U-form. Said antenna is positioned around the shorter part 442 of the footprint 410 situated on the rectangular panel such that the opening of the U-shaped TX/RX RF antenna is face to the longer part 444 of the footprint 410. Thus, the TX/RX RF antenna 430 serves as a stop for the heel of the shoe.

As described above, the shoe-TX/RX RF antenna is composed of three plane segments 910, 920, 930 assembled in a U form. Those three flat segments may be constituted in any suitable disposition known to the person skilled in the art. The inner faces of the U-shaped flat segments are covered with plastic material 940. The inductance of the U-shaped flat coils is for instance of 350 nH.

Figure 4:
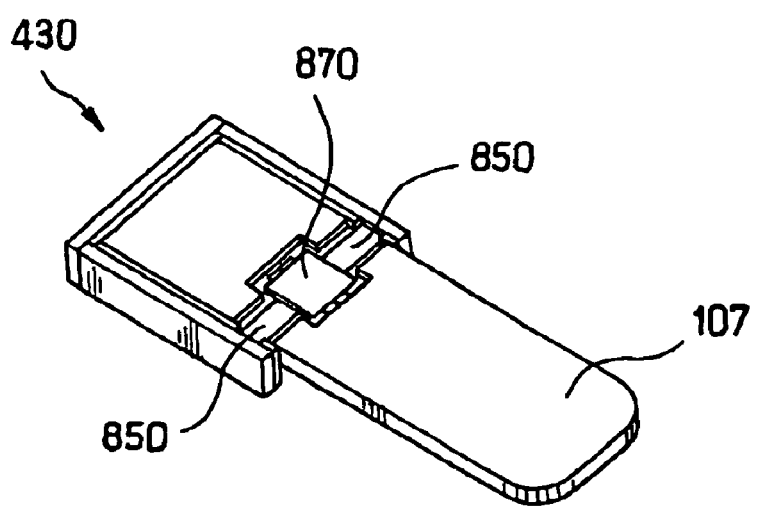
FIG. 4 is another perspective view of the shoe-TX/RX RF antenna in accordance with the present invention.

The TX/RX RF antenna 430 further comprises two contacts 850 in an L form, in order to connect respectively each end of the U-shaped flat coil with a low losses interface network 870 group provided on the bottom surface of the rectangular panel, and situated under the footprint 410 as shown in FIG. 4.

The contact in the L form is positioned such that one end of said contact is connected to the U-shaped flat coil and the other end of said contact is connected to the low losses interface network. The outer faces of the U-shaped flat coils are also covered with plastic material 960.

Now, the detector means will be described in more details.

The detector means comprise the two Helmholtz coils. The two coils, driven by direct current or low frequency alternate current, will be used:
to supply a suitable static magnetic field polarization and, when necessary, an appropriate Zeeman modulation to detect Electron Spin Resonance (ESR) in non-authorized materials with unpaired electrons;
to supply a suitable static magnetic field polarization and, when necessary, an appropriate Zeeman modulation to detect Nuclear Magnetic Resonance (NMR) in hydrogen protons, whose specific frequency chemical shifts are related to the chemical bounds with nitrogen atoms in several non-authorized substances;
to supply an appropriate Zeeman modulation to modulate Nuclear Quadrupole Resonances (NQR) in the non-authorized substances preferentially detected with this principle.

ESR is a magnetic resonance technique which measures the absorption of energy by unpaired electrons in a magnetic field. In the presence of this field, electron spin states and energies are quantized. This separation of electrons with different spins into populations with distinct energies is the electron Zeeman effect. Transitions between these energy states may be induced by interactions with another time-varying external magnetic field and give rise to the resonant absorption of energy measured.

NMR is a physical phenomenon described independently by Felix Bloch and Edward Mills Purcell in 1946 both of whom shared the Nobel Prize in physics in 1952 for their discovery. It involves the interaction of atomic nuclei placed in an external magnetic field with an applied electromagnetic field oscillating at a particular frequency. Magnetic conditions within the material are measured by monitoring the radiation absorbed and emitted by the atomic nuclei. The principle of NMR is that many nuclei spin and all nuclei are electrically charged. In a magnetic field, spinning nuclei have lower energy when aligned with the field than when opposed to it because they behave like magnets. This energy difference corresponds to radio frequencies hence the nuclei are able to absorb and reemit radio waves.

NQR technique can be used to detect specific non-authorized substances in any surroundings. The quadrupole charge distribution of the atom results in alignments of nuclear spins. A radio frequency wave generated by a transmitter coil causes the excitation of nuclear spins to higher quantisized energy levels, absorbing power. The absorption is verified at specific frequencies and at specific RF magnetic field strength levels. This specifies the atoms and functional groups in the molecules. Nitrogen is a quadrupole atom that appears in many types of non-authorized substances. Because of very distinct NQR frequencies the false alarm rate due to other nitrogen containing materials is extremely low.

It has to be noted that in a different embodiment the Helmholtz coils could be replaced by different coil arrangements or, partially, by permanent magnets. The Helmholtz coils can thus be replaced by any means which permit to obtain a uniform magnetic field.

The detector means further comprise the shoe-TX/RX RF antenna 430. The coil generates a field which is orthogonal or largely orthogonal to the magnetic polarizing field generated by the Helmholtz coils, that is, the axis of the antenna coils will be preferentially orthogonal to the axis of the Helmholtz coils.

The antenna coil 430 can be, in the simplest solution, homopolar and single coil, acting as transmitter and receiver at the same time, or, in order to get an increase of immunity and amplification capability, divided at least in two or more sections, one or more receivers and one or more emitters, preferentially placed in a way that the mutual inductive coupling between them is minimum.

The shoe-TX/RX RF antenna is preferentially a high-Q inductor, that is designed with the maximum inductance/resistance ratio for the frequencies of interest. Furthermore, the coil is directly connected to a low losses interface network group, in order to constitute a suitable sensing probe. The low losses interface group enhances the weak Nuclear Magnetic Resonance signals and increases the selectivity of the receiver, rejecting the signals coming from adjacent radio frequencies.

Additional RF coils, properly shaped, surrounding the ankle and calf area can also be provided.

These coils may be placed outside of the uniform static magnetic field generated by the Helmholtz coils and, therefore, can be used for the non-authorized substance detection based on Nuclear Quadrupole Resonance only. Indeed, contrary to NMR and ESR techniques, NQR technique does not need a uniform static magnetic field to be operable.

These coils can be positioned for instance in the side panels 200, but are preferentially positioned closer to ensure a correct detection of the received signal which has a very small intensity.

The Helmholtz coils and the RF coils are connected to an appropriate electronics which generate the Zeeman modulation applied to NQR, NMR (when necessary), and ESR (when necessary) the RF resonance field (which could be Continuous Wave or pulsed) applied to NQR, NMR, and ESR techniques, and the receiving (amplification and demodulation) of the received signals issued from the shoe-TX/RX RF antenna, according to ESR, NQR, and NMR techniques well known by the person skilled in the art. The management of the emission and of the receiving signal is performed by a microcomputer or a PC based system, embedded in the electronics of the analyzer. The computer manages the information coming from the non-authorized substance detection section as will be described in greater details below.

Figure 5:
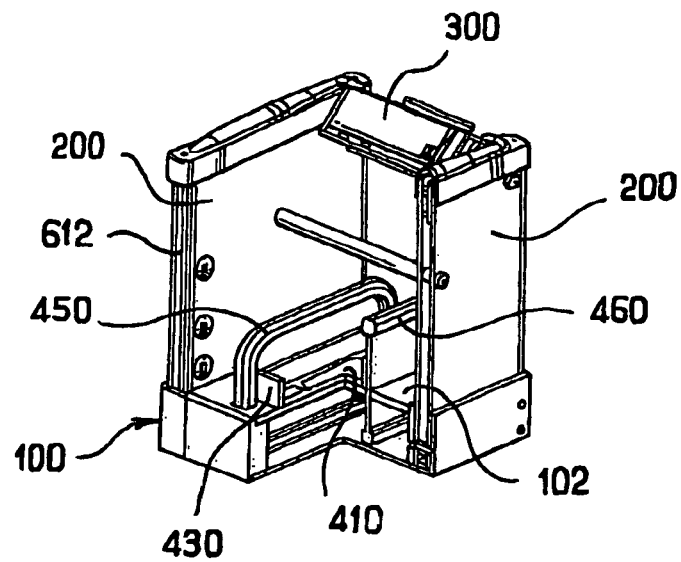
FIG. 5 is a perspective view of an alternative embodiment in accordance with the present invention.
Figure 6:
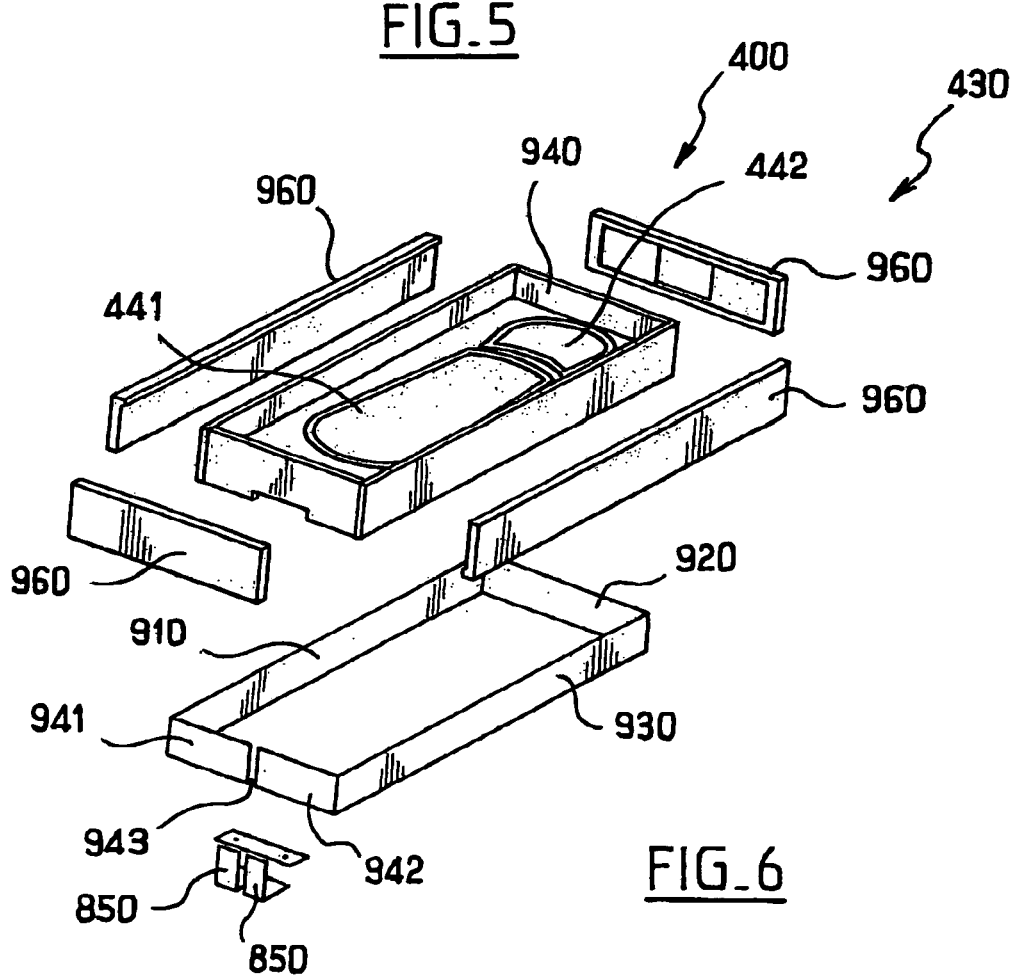
FIG. 6 is a perspective view of an alternative shoe-TX/RX RF antenna in accordance with the present invention.

FIGS. 5 and 6 show an alternative embodiment of the present invention. In this other embodiment, the two Helmholtz coils 450, 460 are in a rectangular form. Moreover, the shoe-TX/RX RF antenna totally wound around the heel of the shoe. The shoe-TX/RX RF antenna illustrated on FIGS. 5 and 6 is composed of five plane segments 910, 920, 930, 941 and 942 assembled in an opened O form. The expression "opened O form" means that O is not closed but comprises little slot 943. The inductance of the flat coils of such shoe-TX/RX RF antenna is for instance of 750 nH. The two Helmholtz coils 450, 460 and the shoe-TX/RX antenna 430 function as above.

The dimensions of the rectangular Helmholtz coils 450, 460 are preferably as follows:

the height of the Helmholtz coils is about 350 mm;
the length of the Helmholtz coils is about 500 mm;
the depth of the Helmholtz coils is about 40 mm.

The dimensions of the shoe-TX/RX RF antenna 430 which totally wounds around the heel are preferably as follows:

width lying in the range 100 millimeters (mm) to 200 mm, typically being about 150 mm;
depth lying in the range 100 mm to 500 mm, typically being about 350 mm; and
height lying in the range 10 mm to 100 mm, typically being about 25 mm.

The present invention can be combined with metal detector means housed for instance inside the side panels 200. Such embodiment comprising bulk detector means combined with metal detector means could permit to detect both non-authorized objects and non authorized substances.

The detector means placed in the side panels 200 may be constituted by transmitter and receiver coils in any suitable disposition known to the person skilled in the art.

Figure 7:
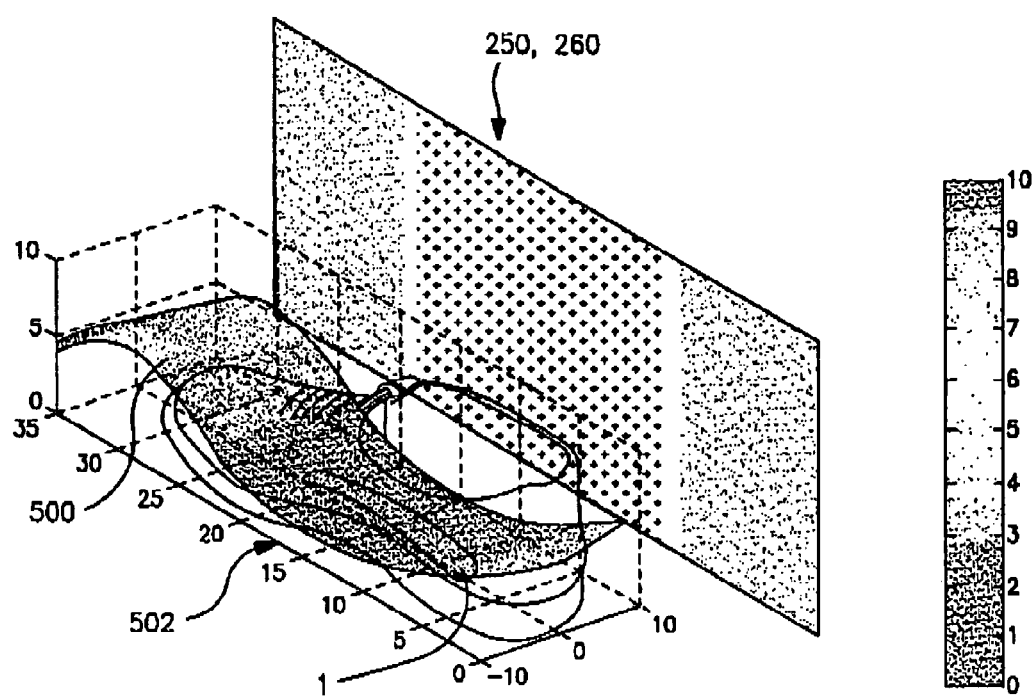
FIG. 7 is a diagram showing the position of a shoe relative to the detector coils.

Such coils are shown diagrammatically in FIG. 7.

Since such coil-based detector means are well known to the person skilled in the art, the shape of the coils is not described in greater detail below.

Nevertheless, it is recalled that the coils preferably comprise a plurality of loops connected in series and in opposite directions for canceling out external interfering effects; the device preferably has coils that are offset from one another both for transmission and for reception, and the coils are preferably powered by signals presenting complex harmonic components.

The use of panels 200 placed vertically and containing the antennas for generating and receiving the field, similar in general concept to a conventional metal detector frame provides the following advantages.

Firstly, it should be observed that such vertical panels 200 enable the antennas to occupy heights that guarantee a useful and uniform signal even if the objects to be detected, weapons or similar prohibited objects, provide very small signals and are positioned at ankle height or above the ankle. In contrast, coils occupying a horizontal plane for example in the support plane of a platform, do not provide this option, since interception sensitivity tapers off quickly with increasing distance from the coils.

Secondly, it should be observed that in the invention the vertical panels are positioned at a small distance from each other (preferably lying in the range 450 mm to 700 mm, and typical about 575 mm) adjusted in such a manner as to obtain simultaneously a good detection signal from the objects being searched for and a degree of tolerance to variations in the transverse position of the shoe under examination.

Finally, and thirdly, it should be observed that using coils and panels that are vertical, rather than using coils that are horizontal, also makes it possible to achieve a large amount of decoupling relative to any metal masses present in the floor. Thus, so far as the device is concerned, detection behavior is obtained that is constant and independent of the site at which it is installed.

According to an advantageous characteristic of the invention, the coils for generating and receiving the electromagnetic field are positioned so that the detection magnetic field is shaped optimally relative to those zones of shoes that usually present a large quantity of metal. Still more precisely, the coils are thus preferably positioned as a function of the zone in which the horizontal metal reinforcing blade is conventionally positioned in the sole of a shoe. This solution makes it possible simultaneously to intercept fraudulent objects that give rise to a minimum amount of signal anywhere in the volume under search, while also obtaining maximum possible discrimination relative to the metal parts that are normally present in shoes, in particular in shoes of large dimensions.

In FIG. 7, under reference 500, there can be seen the sensitivity curve of the receiver and transmitter coils 250 and 260 that are shown diagrammatically in FIG. 7. As mentioned above, it can be seen that the detection magnetic field is advantageously shaped at 502 on the position of the metal reinforcing element referenced 1 provided in the sole of the shoe and more particularly in its "shank".

Figure 8:
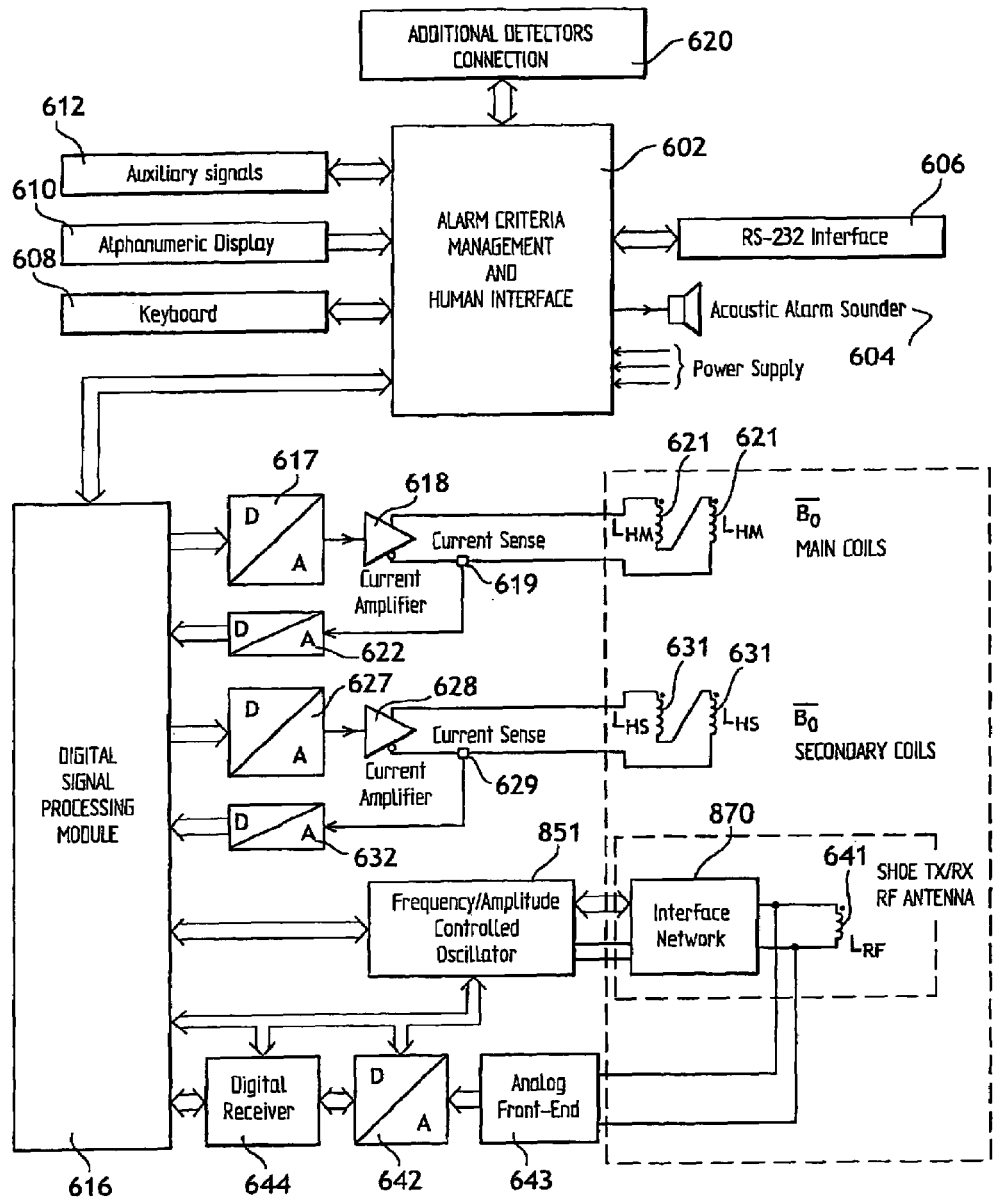
FIG. 8 is a block diagram summarizing the structure of a device in accordance with a preferred embodiment of the present invention.

There follows a description of the structure of the information and processor means shown in FIG. 8. These means have overall reference 600 and they are preferably integrated in the module 300.

In accompanying FIG. 8, there can be seen a central processor unit (CPU) 602 including means for storing the necessary programs and processor means suitable for managing all of the interfaces and making use of the signals that are picked up.

The CPU 602 communicates with:
  means 604 for generating an audible alarm signal or voice messages;
  means 606 providing a connection with an external module, e.g. an interface of the RS232 type;
  means 608 for inputting data, e.g. a keypad;
  a module 610 for displaying alphanumeric characters, for delivering the above-described visible signals for guidance purposes, and preferably;
  a module 612 for indicating the height of the zone in which a prohibited object or substance has been detected.
  an interface module 620 for the connection of additional detectors means as will be described below.

The display means 612 are preferably in the form of two display strips disposed on the front vertical edges of the side panels 200, as can be seen in FIG. 5. Each of these strips 612 is subdivided into a plurality of point display devices that are powered selectively when a determined object is detected, at the height at which detection has occurred.

The provision of such information enables external parties to be immediately aware of the height at which an object or substance has been detected on the individual being inspected, and this enables action to be taken quickly.

The CPU 602 shown in accompanying FIG. 8 is also in communication with a digital signal processing module 616 which controls both the supply of power to the Helmholtz coils 450, 460, the supply of power to the transmitter coils of the shoe-TX/RX RF antenna and also the detection of signals coming from the receiver coils of the shoe-TX/RX RF antenna 430.

In FIG. 8, reference 621 designates the main coils of the two Helmholtz coils 450, 460. The main coils 621 are powered by a current amplifier 618 which is connected to the digital signal processing module 616 via a first DAC 617 (digital-to-analog converter). A current sense 619 is connected in serie with the current amplifier 618 and the main coils 621. The value of the current is sensed by the current sense 619. The output of the current sense 619 is connected to the input of a first ADC 622. Thus, the inputs and outputs of the digital signal processing module 616 which are connected to the first DAC 617 and ADC 622 permit to control the supply of power to the main coils 621 of the Helmholtz coils 450, 460.

Reference 631 designates the secondary coils of the two Helmhotz coils 450, 460. The secondary coils 631 are powered by a current amplifier 628 which is connected to the digital signal processing module 616 via a second DAC 627 (digital-to-analog converter). A current sense 629 is connected in serie with the current amplifier 628 and the secondary coils 631. The value of the current is sensed by the current sense 629. The output of the current sense 629 is connected to the input of a second ADC 632. Thus, the inputs and outputs of the digital signal processing module 616 which are connected to the second DAC 627 and ADC 632 permit to control the supply of power to the secondary coils 631 of the Helmholtz coils 450, 460.

Reference 641 designates the coils of the shoe-TX/RX RF antenna 430. As described above, the coils 641 are connected to an interface network 870 which is connected to a Frequency/Amplitude Controlled Oscillator 851 controlled by the digital signal processing module 616. An Analog Front-end 643 is connected in parallel between the interface network 870 and the coils 641 of the shoe-TX/RX RF antenna 430. The Analog Front-end 643 is connected to the digital signal processing module 616 via a ADC 642 and a digital receiver. In the present embodiment, the shoe-TX/RX RF antenna comprises a homopolar single coil acting as transmitter and receiver at the same time. The part of circuit described above, which comprises the digital receiver 644, the ADC 642, and the Analog Front-End 643 permits to transmit the signal received from the receiver coil 430/641 which will be analyzed to determine the presence or the absence of non-authorized substance in the analyzed shoe.

Figure 9:
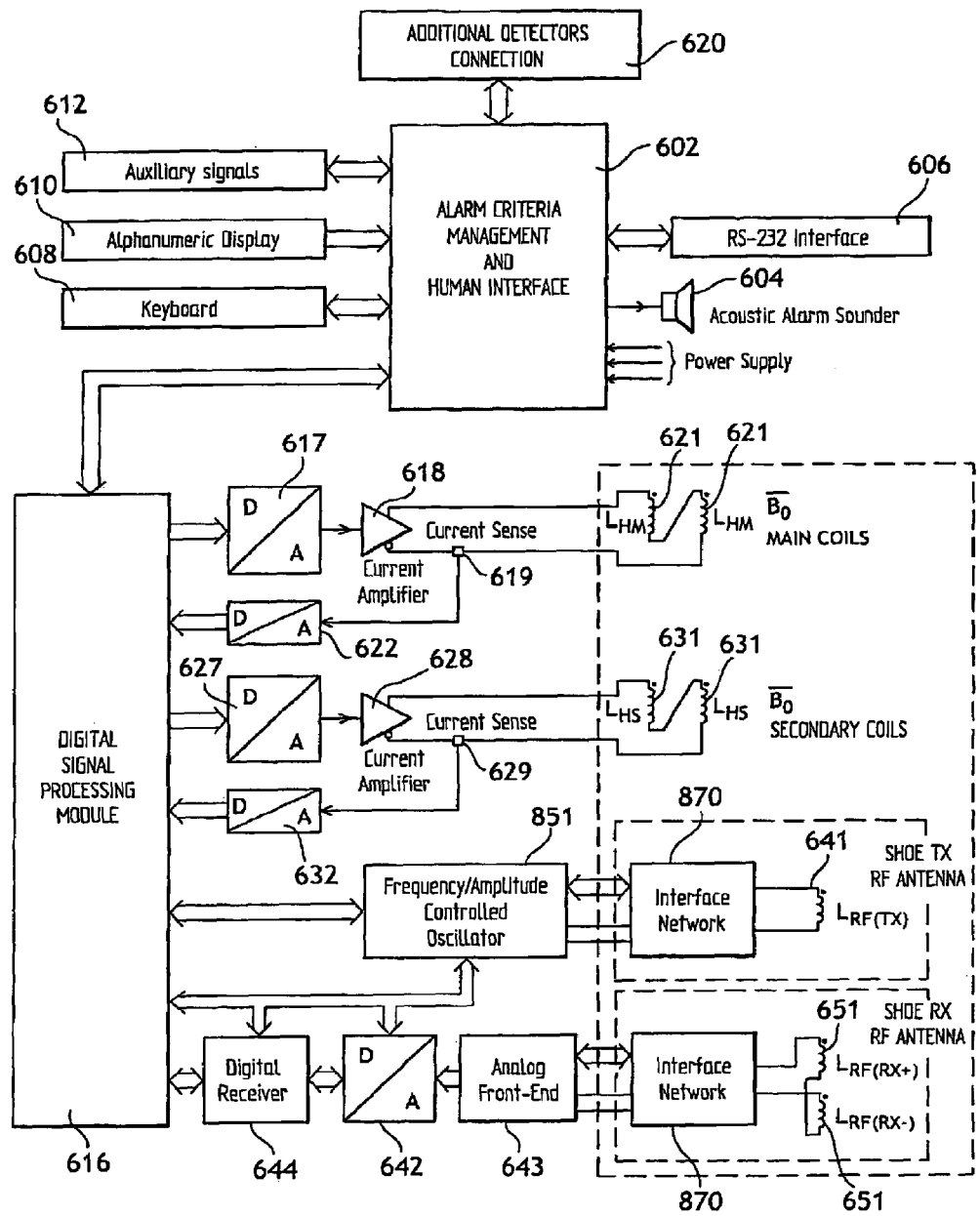
FIG. 9 is a block diagram summarizing the structure of a device in accordance with an alternative embodiment of the present invention.

In order to get an increase of immunity and amplification capability, the single coil of the shoe-TX/RX RF antenna 430 can be divided at least in two or more sections. FIG. 9 show an alternative embodiment of the present invention where the shoe-TX/RX RF antenna 430 comprises a shoe-TX RF antenna comprising a single coil 641 acting as transmitter (single TX antenna), and a shoe-RX RF antenna comprising a balanced coil 651 acting as receiver (balanced RX antenna).

Naturally it will be understood by the person skilled in the art that the embodiments shown in FIGS. 3 and 6 which represent two forms of a shoe-TX/RX RF antenna having a single coil acting as transmitter (TX) and receiver (RX) at the same time must be adapted by providing additional elements which permit to realize the coils acting as balanced RX antenna.

The other elements of FIG. 9 are the same as in FIG. 8. The particular type of the shoe-TX/RX antenna (single TX, balanced RX) allows a better neutralization of the outside electromagnetic noise.

Figure 10:
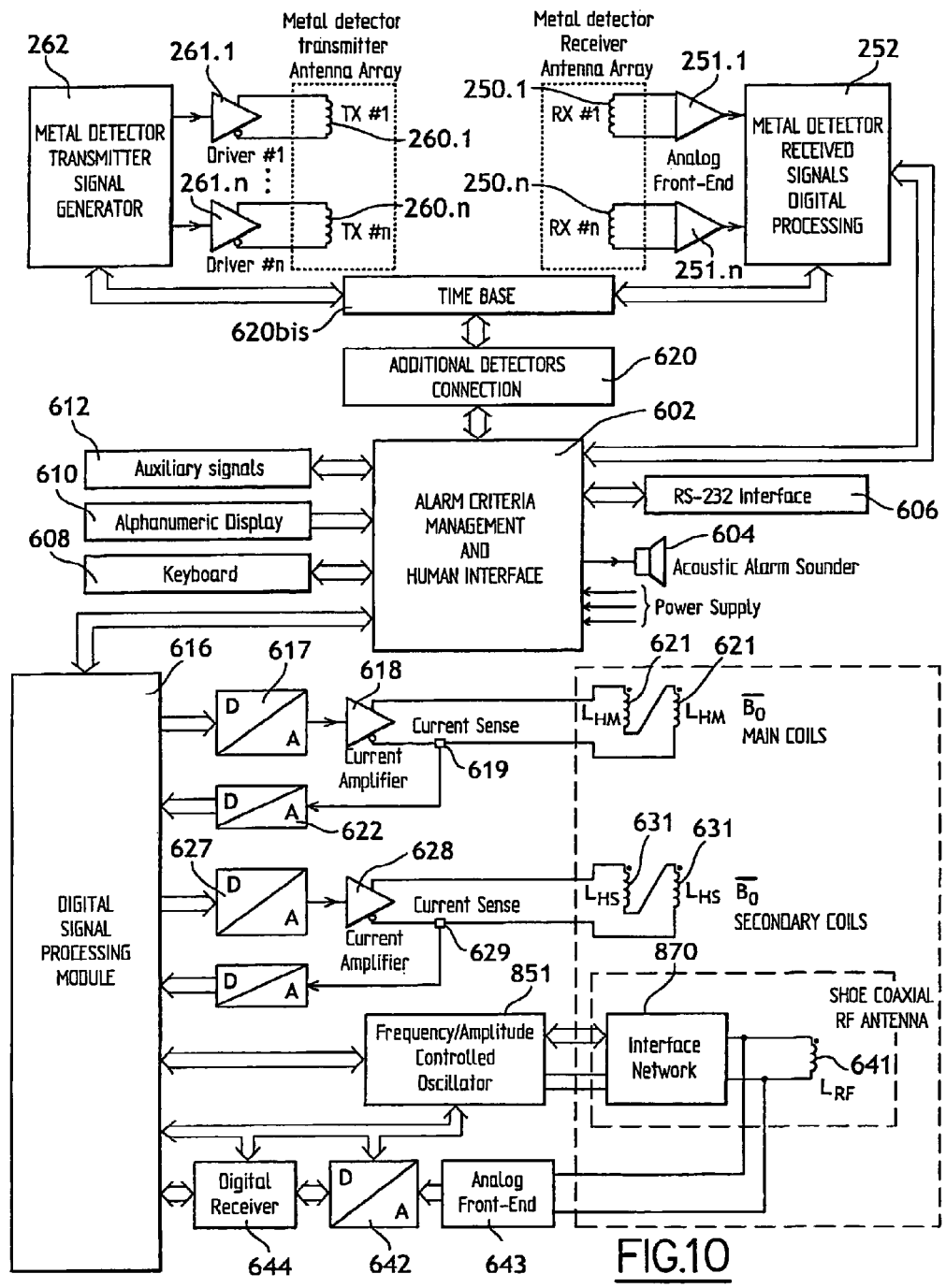
FIG. 10 is a block diagram summarizing the structure of a device in accordance with another alternative embodiment of the present invention.

As described above, the present invention can be combined with metal detector means housed for instance inside the side panels 200. FIG. 10 shows an alternative embodiment of the present invention comprising both metal and substances detection means.

The CPU 602 communicates with means 604 for generating an audible alarm signal or voice messages, means 606 providing a connection with an external module, e.g. an interface of the RS232 type, means 608 for inputting data, a module 610 for displaying, alphanumeric characters, a module 612 for indicating the height of the zone in which a prohibited object or substance has been detected and a digital signal processing module 616 as described above.

The CPU 602 shown in accompanying FIG. 10 is also connected to the interface module 620 which allows the communication with additional detection means. A time base 620bis connected to the interface module 620 controls both the supply of power to the transmitting coils and also, synchronously therewith, the detection of signals coming from the receiver coils.

In FIG. 10, references 260.1, 260.n designate independent transmitter coils powered by respective driver circuits 261.1, 261.n, themselves connected to an excitation signal generator 262 driven by the time base 620. FIG. 10 also uses references 250.1, 250.m to designate independent receiver coils connected to respective amplifier circuits 251.1, 251.m connected to a circuit 252 for shaping the received signals coming from the amplifiers 251.1, 251.m. The circuit 252 is clocked by the time base 620bis and it is connected to the CPU 602.

Naturally, the number of transmitter coils 260 and the number of receiver coils 250 is not restricted to two. Furthermore, the number of transmitter coils 260 is not necessarily identical to the number of receiver coils 250.

The operation of such a circuit is itself known to the person skilled in the art and is therefore not described in greater detail below.

Figure 11:
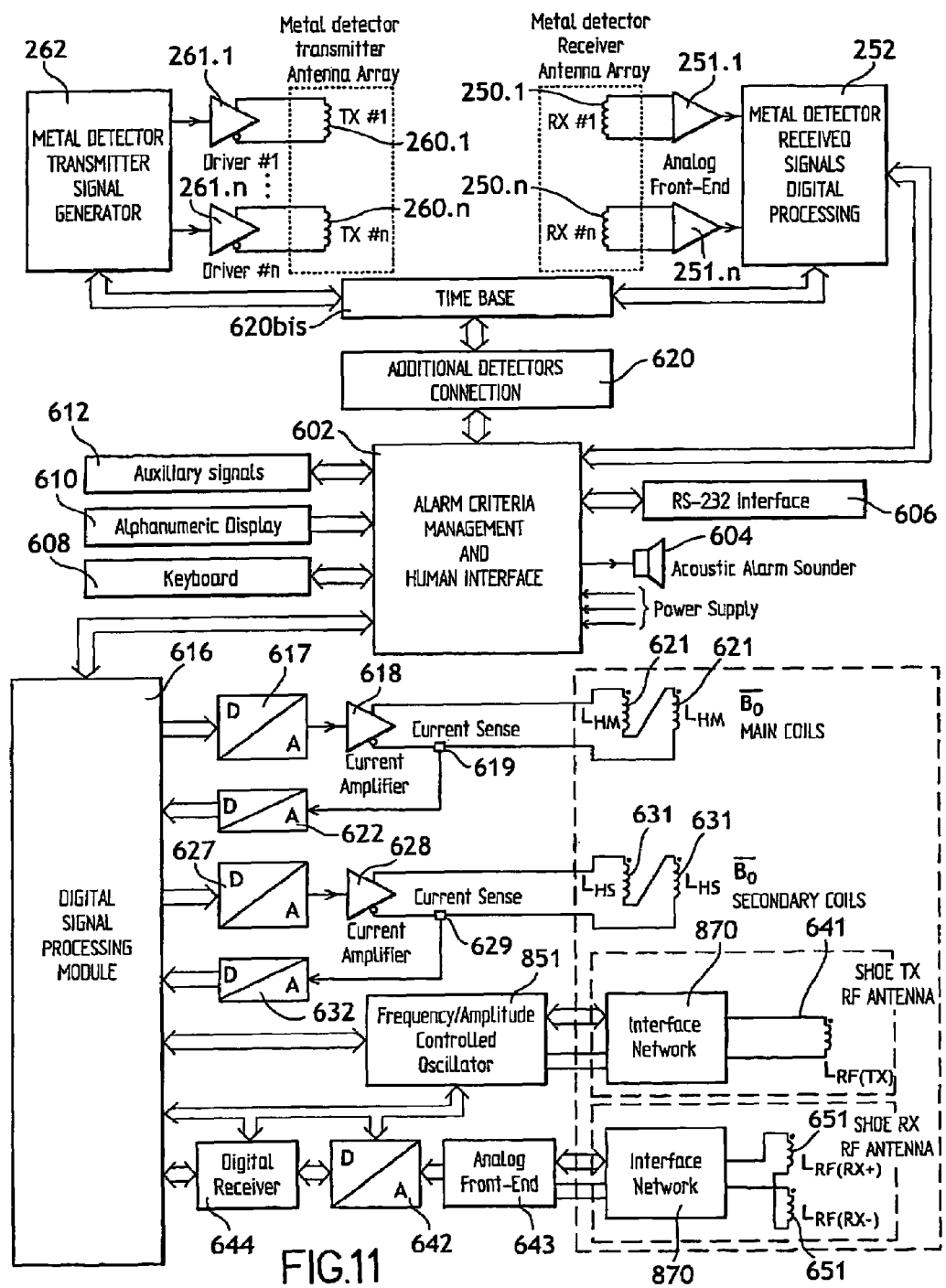
FIG. 11 is a block diagram summarizing the structure of a device in accordance with another alternative embodiment of the present invention.

In FIG. 10, the illustrated embodiment comprises a shoe-TX/RX RF antenna having a single coil 641 acting as both transmitter and receiver (single TX/RX antenna). In FIG. 11, the illustrated embodiment comprises substance and metal detector means. The shoe-TX/RX RF antenna 430 comprises a single coil 641 acting as transmitter (single TX antenna) and a balanced coil 651 acting as receiver (balanced RX antenna).

Figure 12:
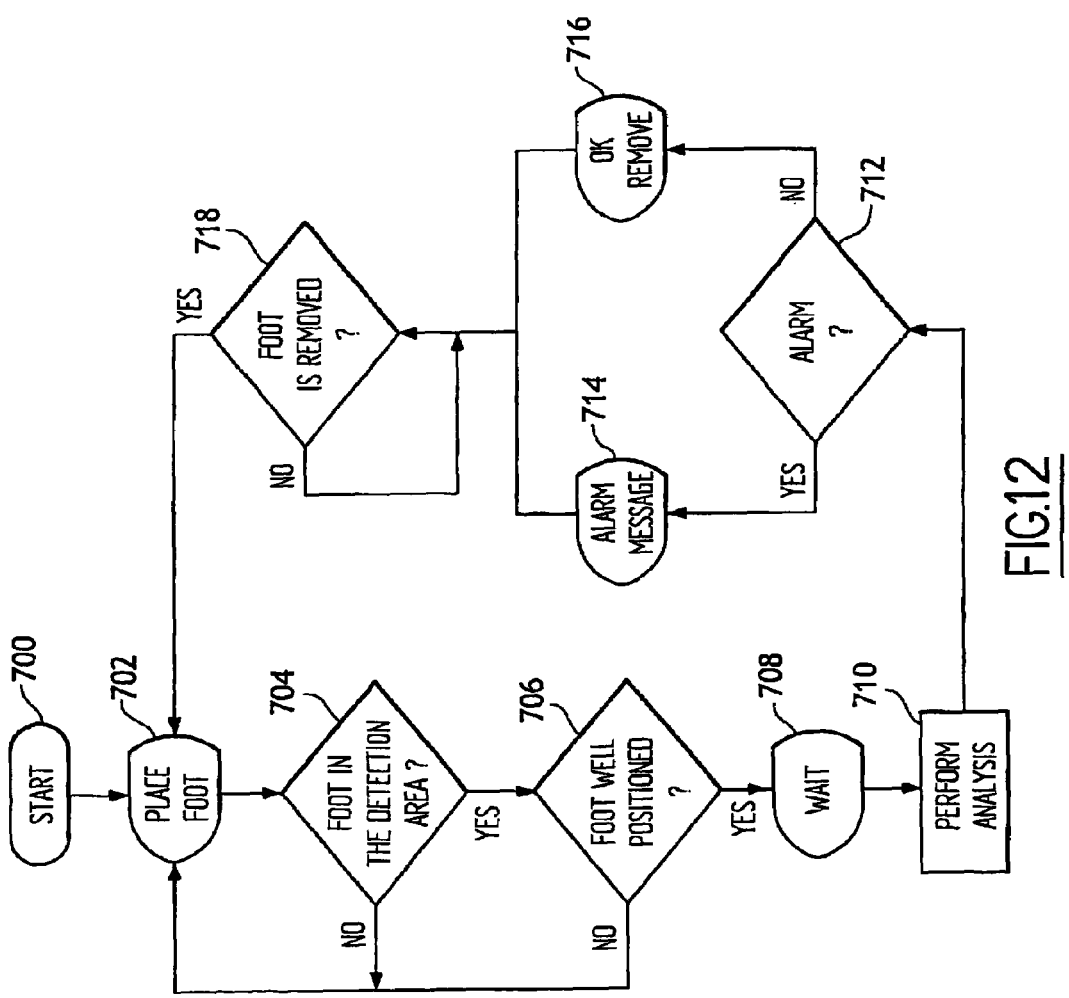
FIG. 12 is a flow chart showing the operation of the device.

With reference to FIG. 12, there follows a description of the general flow chart for operation of such a device.

In FIG. 12, step 700 is an initialization step.

Step 702 is a step of displaying a signal, for example "PLACE FOOT" indicating that the appliance is ready to make a measurement.

In step 704, the CPU 602 uses any appropriate processing (based on the signals coming from the receiver coils 250 or the Helmholtz coils 450 460 or the signal from an auxiliary detector, e.g. an optical detector) to examine whether a shoe is present in the detection field.

If not, step 702 is repeated.

On the contrary, if a shoe is present, step 704 is followed by step 706 during which the CPU examines whether a shoe is properly positioned on the footprint.

If not, step 702 is repeated.

Otherwise, if the shoe is properly positioned, step 706 is followed by a step 708 which is a timing step.

During following step 710, the CPU performs analysis proper of the signals coming from the non-authorized substance detector means (and from the metal detector means if both metal and non-authorized substance detector means are combined).

After this step 710, the CPU 602 proceeds during a step 712 with analysis of the result of processing the signals to determine whether or not this should lead to an alarm.

If so, step 712 is followed by a step 714 during which a sound signal is emitted via the means 604 and/or a suitable visible signal is emitted by the display 610.

Otherwise, if there is no alarm, step 712 is followed by a step 716 indicating to the individual being inspected and to the inspection personnel that no non-authorized substance has been detected, e.g. by displaying a signal "OK REMOVE".

Steps 714 and 716 are followed by step 718 during which the CPU 602 uses any appropriate processing (based on the signals coming from the receiver coils 250 or the Helmholtz coils 450 460 or the signal from an auxiliary detector, e.g. an optical detector) to examine whether the shoe has been removed from the detection field.

If not, step 718 is repeated.

If so, step 718 loops back to above-described display step 702.

As mentioned above, the device in accordance with the present invention preferably includes means for randomly drawing lots to designate individuals randomly for undergoing one or more additional tests. By way of example, the additional test(s) may consist in manual palpation or in automatic analysis apparatus, e.g. for picking up and analyzing vapor or traces of particles, e.g. of drugs.

Figure 13:
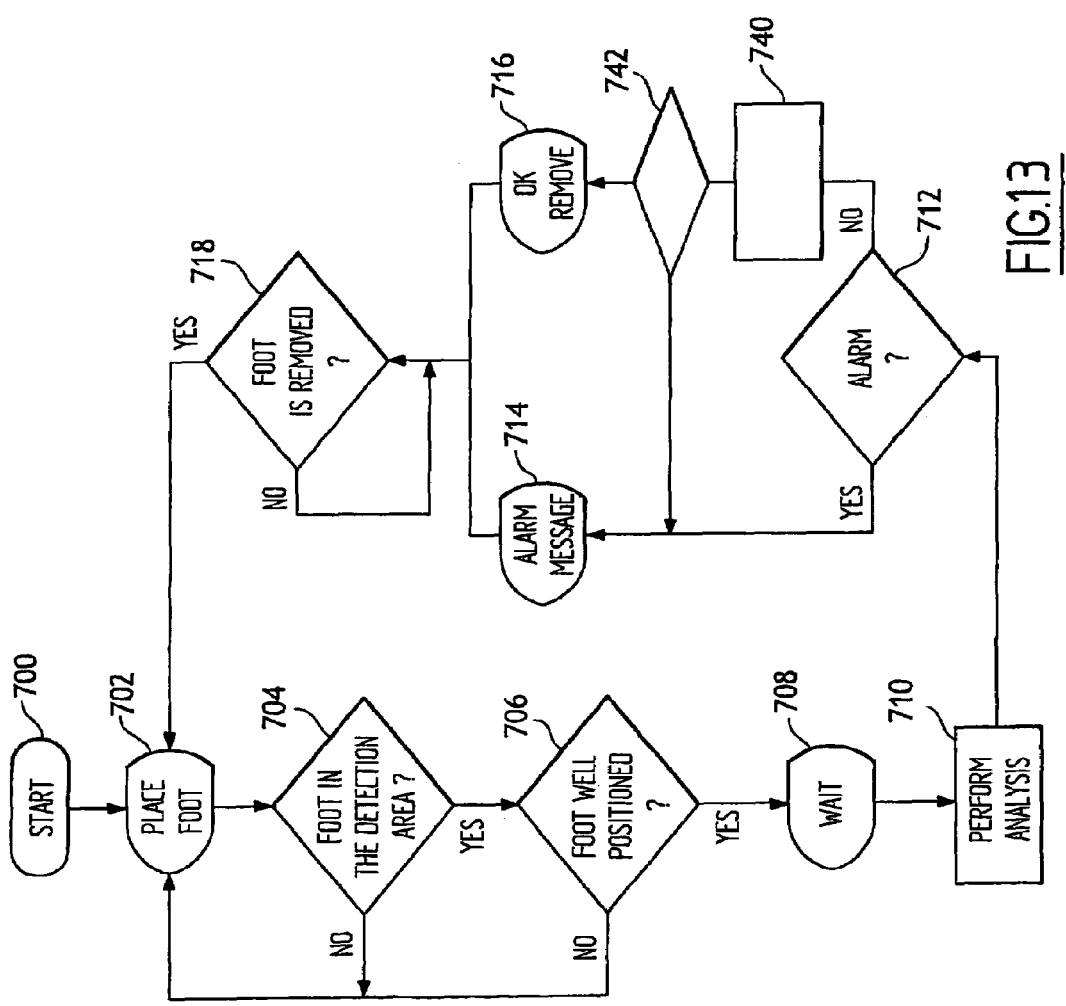
FIG. 13 is a flow chart in accordance with a variant embodiment of the present invention that includes a step of randomly drawing lots for directing individuals to one or more additional test.

The flow chart describing the operation of such a device including random drawing of lots is shown in FIG. 13.

This figure shows all of the steps described above with reference to FIG. 12. They are therefore not described again. Nevertheless, it should be observed that the flow chart shown in FIG. 13 is specific to a device that includes means for randomly drawing lots for designation purposes and further comprises two additional steps 740 and 742 interposed between steps 712 and display steps 714 and 716.

If an alarm is detected in step 712, that is always followed by display step 714.

However, if no alarm is detected in step 712, it is followed by the step 740 in which a random number is drawn. Then, in step 742, the CPU 602 determines whether or not the individual who is being inspected has been selected randomly. If so, step 742 is followed by display step 714. Otherwise, step 742 is followed by the display step that leads to authorization 716.

Figure 14:
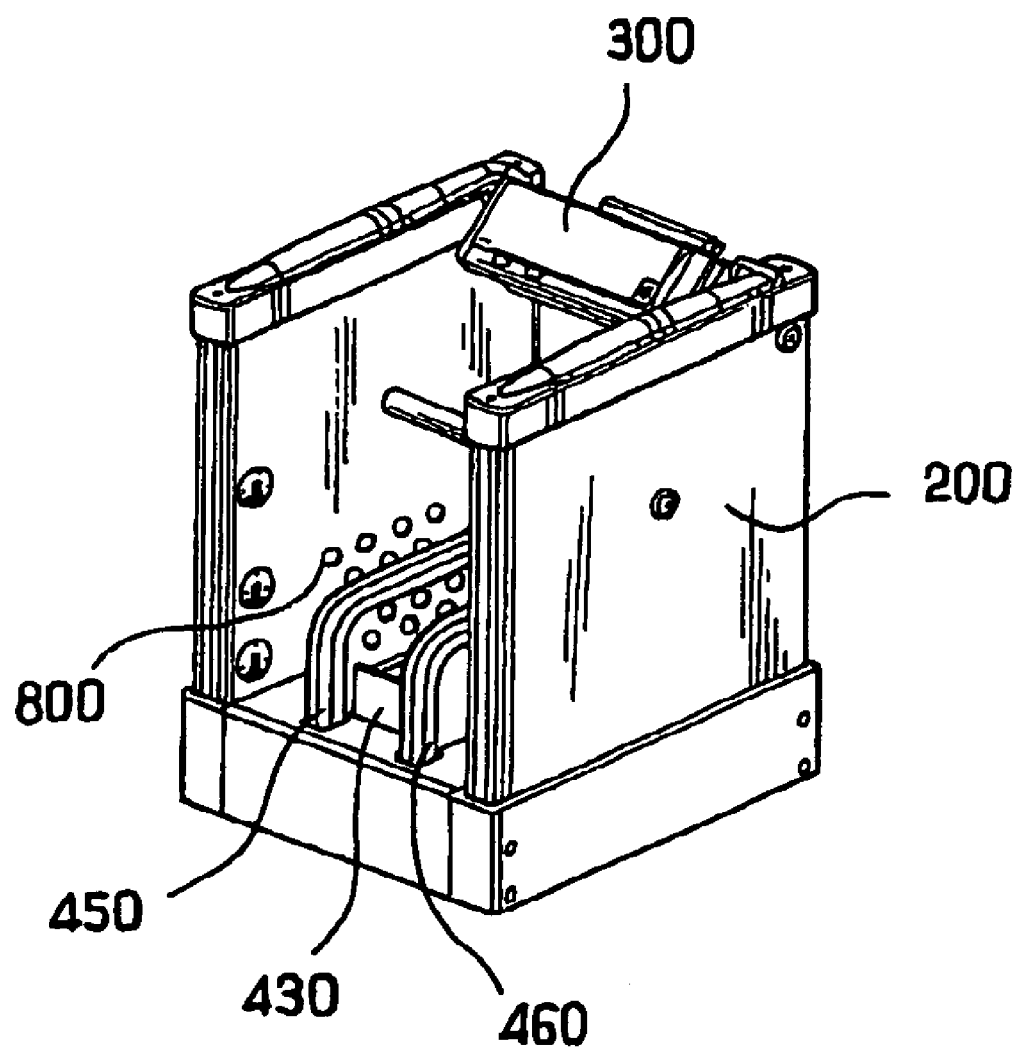
FIG. 14 is a perspective view of another alternative embodiment of the present invention.

As mentioned above, the device in accordance with the present invention can be associated with means for sucking in vapor and/or traces of prohibited material (trace detector), e.g. drugs that might come from the shoes. Such suction intake means are preferably integrated in the side panels 200 and in the step-forming supporting base 100. Thus, FIG. 14 shows a variant embodiment of the device in which the side panels 200 and the supporting base 100 include a plurality of suction nozzles 800.

The nozzles 800 are preferably followed by filters and flow control means. These flow control means are themselves connected to the inlet of a pump actuated by a motor. The outlet from the pump is connected to a suitable detector, for example of the mass spectrometer type. The detector and the motor are connected to and driven by a processor unit, connected itself to the CPU.

The above-mentioned analysis system can be placed in any appropriate location in the device, and preferably inside the supporting base.

In a variant embodiment, the nozzles may be replaced directly by specialized monolithic sensors that are electrically connected to the processor unit.

Compared with the prior art, the present invention offers the following advantages in particular:

- high, consistent and multiple security level for the inspection;
- very fluid passage without requiring specialized inspection personnel;
- elimination of the costs of specialized personnel dedicated in known applications to inspecting shoes manually;
- increasing comfort to the public by eliminating the difficulties caused by removing shoes and putting them back on again and by the waste of time associated with such an operation;
- eliminating the need for X-ray appliances that are required in certain known applications for inspection purposes;
- the device is lightweight and compact and is therefore easy to move and adapt to any site;
- shoes are not analyzed in differential mode as is the case in certain known appliances, but in absolute manner shoe by shoe. Each shoe is thus evaluated separately and detection is performed independently of any comparison with the other shoe. The inventor has found that this disposition makes it possible to guarantee that minimum-signal targets are intercepted safely under all transport conditions;
- shoe analysis is not limited to the bottom portions thereof, or to the portions immediately adjacent thereto, but by using a measuring magnetic field that is highly uniform and structured, it also covers the leg at calf height without any variation in sensitivity and thus without any degradation in the services provided. This guarantees safety even when minimum-signal targets are being carried at ankle level or above the ankle;
- the system in accordance with the invention for investigating shoes under examination and for performing the associated analysis make it possible to detect critical, minimum-signal targets while simultaneously distinguishing them from parasitic signals. Consequently, the attention of operators specialized in inspection is focused on a limited number of cases, with the corresponding advantages for safety;
- ergonomically, the appliance is simple and comfortable. It does not require the person being inspected to behave in unusual ways or to take up embarrassing positions. The time required for analysis can be minimized; and
- the use of a supporting base in the form of a step (associated with position-identifying means) guarantees detection on a single shoe, with the other shoe standing on the ground being kept outside the detection field.

As described above, the present invention can be declined in different embodiment.

A first embodiment comprises the support base (100) associated with detector means adapted to detect a target substance by employing Nuclear Quadrupole Resonance technique without modulating field (Zeeman modulation) to detect said non-authorized substance. The detector mean of the first embodiment comprises the shoe-TX/RX RF antenna 430.

A second embodiment comprises the support base (100) associated with detector means adapted to detect a target substance (bulk detector) by employing Nuclear Quadrupole Resonance technique with modulating field (Zeeman modulation) to detect said non-authorized substance. The detector mean of the first embodiment comprises the shoe-TX/RX RF antenna 430 and the Helmholtz coils 450, 460 (to generate the Zeeman modulation). The modulating field (Zeeman modulation) generated by the Helmholtz is used, combined with synchronous demodulator, to extract more easily effective signal from the background noise, is not obligatory.

Other embodiments can be obtained by combining the bulk detector with the metal detector described above, or with the trace detector described above or with both, or also by combining, in the bulk detector, different induction Magnetic Resonance techniques (NMR, ESR, NQR).

Figure 15:
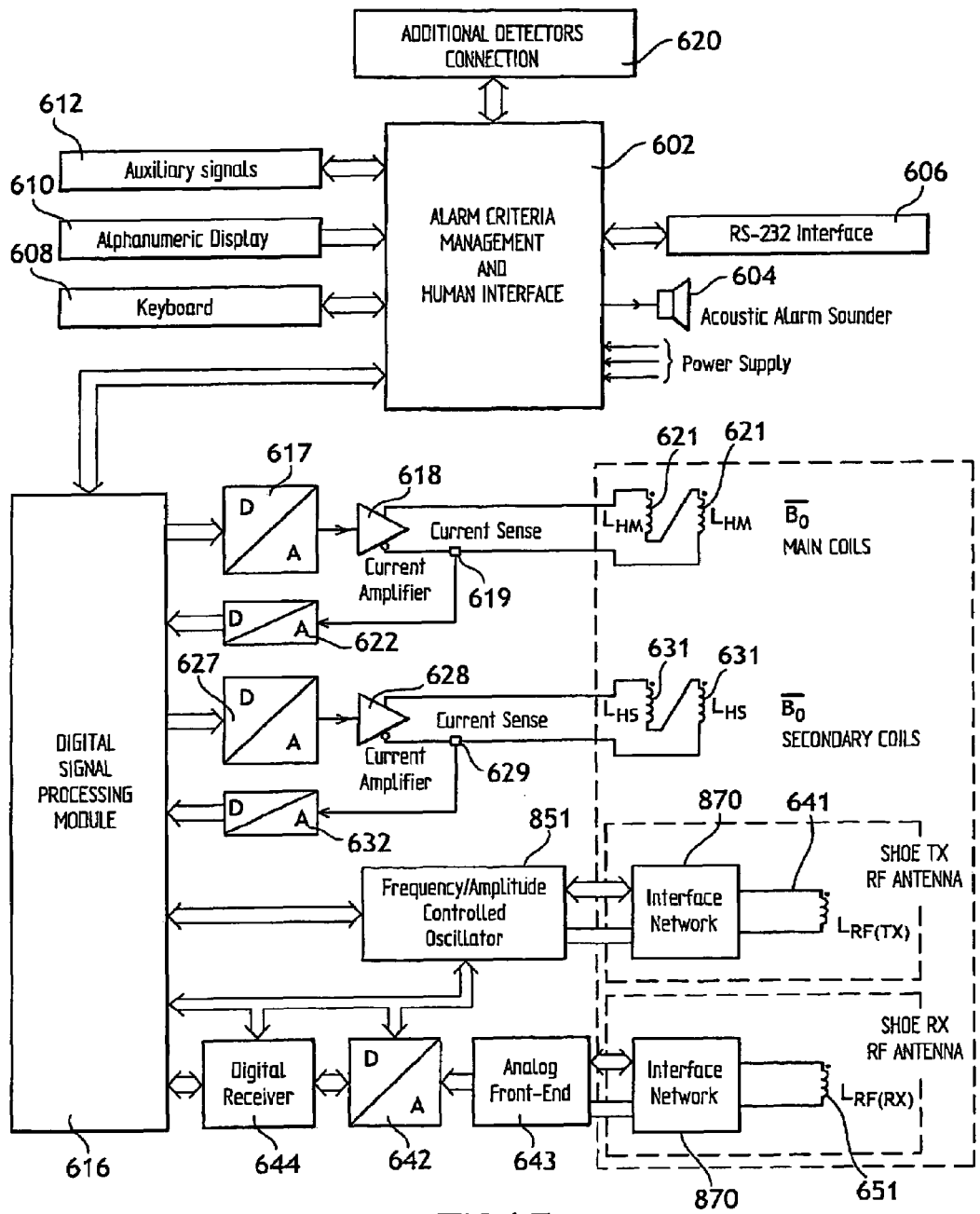
FIG. 15 is a block diagram summarizing the structure of a device in accordance with another alternative embodiment of the present invention.

Moreover, as illustrated on FIG. 15, an additional embodiment for the shoe-TX/RX RF antenna can be a shoe-TX RF antenna comprising a single homopolar coil acting as emitter, and a shoe-RX RF antenna comprising a single homopolar coil acting as receiver.

Naturally, the present invention is not limited to the particular embodiments described above, but extends to any variant within the spirit of the invention.

Nor is the invention limited to a particular application, and it can be used in any sensitive zone such as a school, a station, a private or public undertaking, a stadium, a concert hall, a demonstration, etc . . . .

The invention claimed is:

1. A device for detecting at least a non-authorized material in a zone with protected access, the device being characterized by the fact that it comprises in combination:
    - a supporting base (100) designed to receive a single foot wearing a shoe, of an individual to be inspected;
    - detector means (430, 450, 460) adapted to detect a target material by employing at least one magnetic resonance technique to detect said non-authorized material and associated with the support base (100); and
    - position-identifying means (400) on the support base (100) suitable for imposing accurate positioning of the foot shoe of the individual being inspected relative to the detector means.

2. A device according to claim 1, characterized by the fact that the at least one magnetic resonance technique employed is Electronic Spin Resonance or is Nuclear Magnetic Resonance or is Nuclear Quadrupole Resonance or are Electronic Spin Resonance and Nuclear Magnetic Resonance, or are Electronic Spin Resonance and Nuclear Quadrupole Resonance, or are Nuclear Magnetic Resonance and Nuclear Quadrupole Resonance, or are Electronic Spin Resonance, Nuclear Magnetic Resonance, and Nuclear Quadrupole Resonance.

3. A device according to claim 1, characterized by the fact that the supporting base (100) comprises a block in the form of a step with the position-identifying means (400) on its top surface (102).

4. A device according to claim 3, characterized by the fact that the two Helmholtz coils (450, 460) are driven by direct current or low frequency alternate current, and in that they are used:
    - to supply a suitable static magnetic field polarization and, when necessary, an appropriate Zeeman modulation to detect Electron Spin Resonance (ESR) in non-authorized substances with unpaired electrons;
    - to supply a suitable static magnetic field polarization and, when necessary, an appropriate Zeeman modulation to detect Nuclear Magnetic Resonance (NMR) in hydrogen protons;
    - to supply an appropriate Zeeman modulation to modulate Nuclear Quadrupole Resonances (NQR) in the substances preferentially detected with this principle.

5. A device according to any one of claim 4, characterized by the fact that the coil drivers are current controlled amplifiers in order to ensure the same magnetic generated field, independently from temperature and other environmental variations.

6. A device according to claim 3, characterized by the fact that the two Helmholtz coils (450, 460) are partially embedded inside the supporting base (100).

7. A device according to claim 3, characterized by the fact that the axis of the Helmholtz coils (450, 460) are shifted about 10 to 20 mm over the top surface (102) of the supporting base (100) such that the center of mass of the shoe content and the axis of the Helmholtz coils are situated on the same horizontal plane.

8. A device according to claim 1, characterized by the fact that the detector means comprise two Helmholtz coils (450, 460), assembled on the two sides of the position-identifying means (400), the winding planes of said coils being positioned at a reciprocal distance equals to the mean radius of said coils.

9. A device according to claim 8, characterized by the fact that the Helmholtz coils (450, 460) are equals (symmetric) and connected in series, in order to be supplied exactly with the same current.

10. A device according to claim 8, wherein each Helmholtz coil (450, 460) is composed by two coils, one main coil driven at low frequency or by a direct current, and a secondary coil able to generate a fast magnetic field modulation sweep.

11. A device according to claim 8, characterized by the fact that the detector means comprise additional RF coils, properly shaped, surrounding the ankle and calf area of the individual being inspected, said additional RF coils being outside of the uniform static magnetic field generated by the Helmholtz coils and, therefore, being used for the substance detection based on Nuclear Quadrupole Resonance.

12. A device according to claim 8, characterized by the fact that the detector means further comprises a shoe-TX/RX RF antenna (430), totally or partially wound around the heel of the shoe or around the whole shape of the shoe, in order to get the maximum coupling with the materials concealed in the heel or in the whole shape of the shoe.

13. A device according to claim 12, characterized by the fact that the coil of the shoe-TX/RX RF antenna (430) generates a field which is orthogonal or largely orthogonal to the magnetic polarizing field generated by the Helmholtz coils (450, 460).

14. A device according to claim 12, characterized by the fact that the coil of the shoe-TX/RX RF antenna (430) is a single coil, and acts as transmitter and receiver at the same time.

15. A device according to claim 12, characterized by the fact that the coil of the shoe-TX/RX RF antenna (430) is divided in at least two or more sections, one or more receivers and one or more emitters, preferentially placed in a way that the mutual inductive coupling between them is minimum.

16. A device according to 12, characterized by the fact that the RF shoe-TX/RX antenna (430) is a high-Q inductor.

17. A device according to claim 12, wherein the coil of the shoe-TX/RX RF antenna (430) connected to an interface network circuit.

18. A device according to claim 1, characterized by the fact that it includes means (300) delivering visible or audible messages guiding the user during the successive detection steps.

19. A device according to claim 1, characterized by the fact that the detector means further comprise means adapted to detect metal objects.

20. A device according to claim 19, characterized by the fact that it further includes two vertical panels (200) projecting from the supporting base (100) and housing the means adapted to detect metal objects.

21. A device according to claim 1, characterized by the fact that it includes means (300) for picking up vapors or traces of particles, and for analyzing said vapors or traces.

22. A device according to claim 21, characterized by the fact that the means for picking up vapors or traces comprise suction nozzles (300) on the supporting base (100) and on the vertical panels for picking up vapors or traces of particles.

23. A device according to claim 21, characterized by the fact that the vertical panels (200) possesses suction nozzles (300) for picking up vapors or traces of particles.

24. A device according to claim 1, characterized by the fact that at least one of the vertical panels includes means (512) for displaying the height at which a prohibited object has been detected.

* * * * *

UNITED STATES PATENT AND TRADEMARK OFFICE
CERTIFICATE OF CORRECTION

PATENT NO. : 7,352,180 B2  Page 1 of 1
APPLICATION NO. : 10/817387
DATED : April 1, 2008
INVENTOR(S) : Manneschi It is certified that error appears in the above-identified patent and that said Letters Patent is hereby corrected as shown below:

In Column 14, Claim 1, line 37, please insert -- and -- after "foot" to read "foot and shoe".

Signed and Sealed this

Sixth Day of January, 2009

JON W. DUDAS
*Director of the United States Patent and Trademark Office*